Feb. 23, 1971  J. A. SCOPATZ  3,566,346
TRANSDUCER ARRAY EXPANSION MECHANISM
Filed May 19, 1969  5 Sheets-Sheet 1

INVENTOR
JOHN A. SCOPATZ
BY
ATTORNEYS

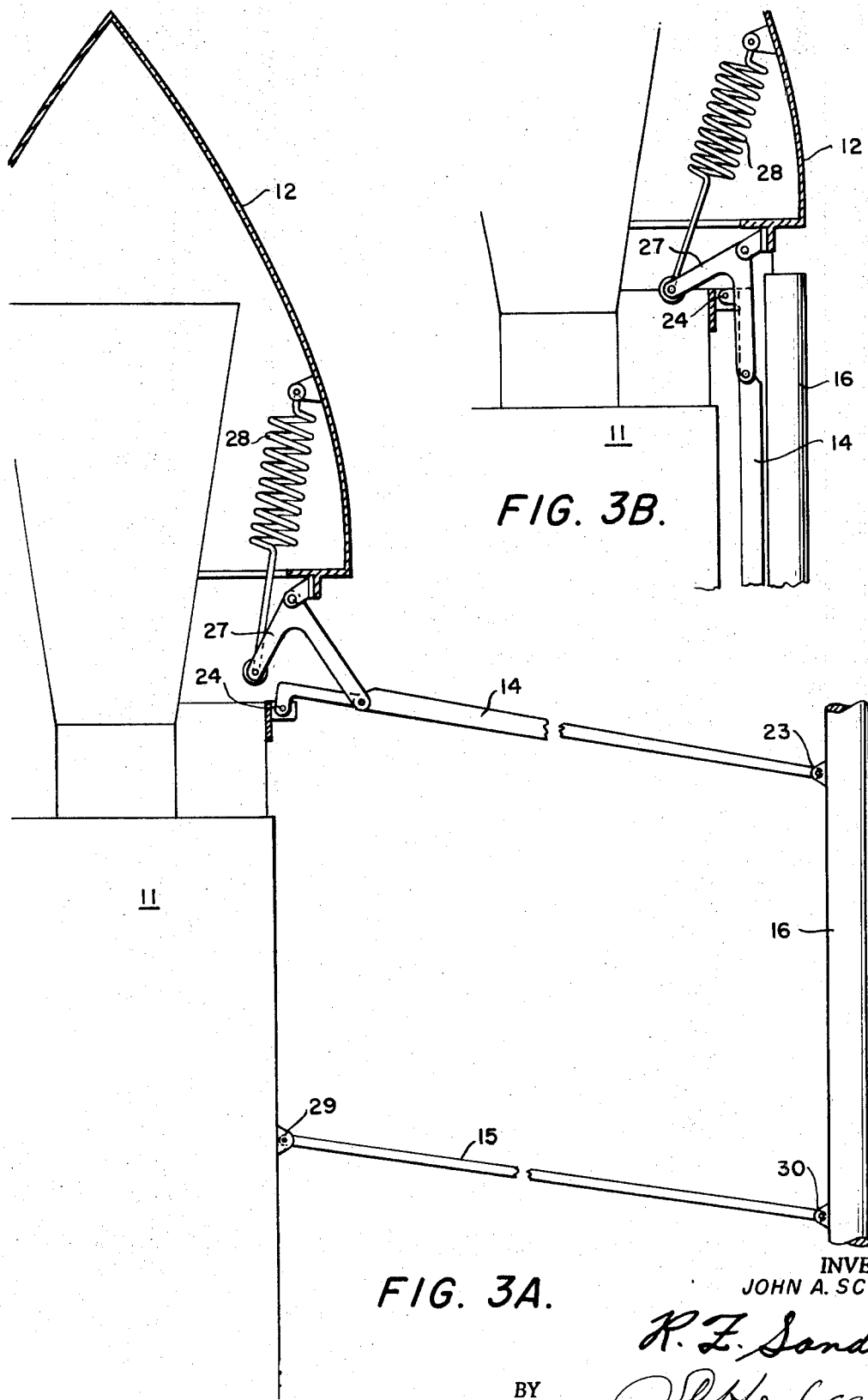

Feb. 23, 1971          J. A. SCOPATZ          3,566,346

TRANSDUCER ARRAY EXPANSION MECHANISM

Filed May 19, 1969          5 Sheets-Sheet 4

INVENTOR
JOHN A. SCOPATZ

BY
ATTORNEYS

INVENTOR
JOHN A. SCOPATZ

BY

ATTORNEYS

United States Patent Office 3,566,346
Patented Feb. 23, 1971

3,566,346
TRANSDUCER ARRAY EXPANSION MECHANISM

John A. Scopatz, Woodland Hills, Calif., assignor, by mesne assignments, to the United States of America as represented by the Secretary of the Navy
Filed May 19, 1969, Ser. No. 825,588
Int. Cl. H04r 1/00
U.S. Cl. 340—8       8 Claims

ABSTRACT OF THE DISCLOSURE

A unified sonar transducer array with an expansion mechanism employing triangular truss-type arms and a fail-safe mechanism which collapses the array upon loss of power.

BACKGROUND OF THE INVENTION

The present invention relates to a support structure for underwater sensing equipment and more particularly pertains to a new and improved sonar unit including an expansible array of staves, each of which contain transducer assemblies.

In the field of sonar, prior art units have been constructed and used which employ a single transducer and other units have been constructed which employ multiple transducers. Despite the advantages of a multiple transducer unit for spatial correlation of signals, such units have never gained universal acceptance for operational system use due to their complexity and propensity for failure. Spatial signal correlation requires and is a function of the transducer separation in at least two dimensions which requires, in turn, a supporting structure for the transducer having large dimensions. Such a structure must withstand launching, lowering to a desired depth, and retrieval without damage. There are, therefore, outstanding requirements for a unit which includes among its performance characteristics good overall reliability and as small a size and weight figure as possible. For proper electrical performance, excellent stability and rigidity of the array itself is required. Such requirements have proved difficult to achieve in the past, however, the present invention does teach a configuration which does meet these requirements.

Accordingly, it is an object of the present invention to provide an apparatus of novel construction for the extension, retraction, and support of transducer equipment as an array.

Another object is to provide an improved transducer array expansion mechanism for a sonar unit.

A further object of the invention is the provision of a fail-safe mechanism to automatically collapse a sonar array upon loss of power.

Still another object is to provide an improved collapsible sonar transducer array unit adapted to be launched and retrieved at sea under a wide variety of service conditions.

A still further object is to provide a sonar transducer array unit with improved reliability and durability characteristics.

Another object is to provide a sonar transducer array unit of low fabrication and maintenance costs.

Still another object is to provide a transducer array with improved stability and rigidity characterstics without substantial increase in size or weight.

Other objects and advantages, as well as the exact nature of the invention, will be readily apparent to those skilled in the art from the consideration of the following disclosure of the invention.

SUMMARY OF THE INVENTION

The present invention accomplishes the above cited objects by providing a sonar transducer array unit which is suitable for operational use in that it is relatively simple in construction, stable, rigid, and both reliable and durable.

Provided is a light weight unit that can be conveniently transported with the array folded in a compact configuration. In operation, the unit can be lowered to a desired depth and the array then opened. On completion of the acoustic operation the array is retracted or collapsed and the unit retrieved. The unit is comprised of a generally cylindrically shaped midbody which contains most of the electronics and the motor drive elements. A number of hollow staves, each of which contain a number of transducer elements, are attached to the midbody by rigid support arms in such a fashion that the staves can be radially extended in a parallel fashion away from the midbody during the acoustical operation. Otherwise, during lowering, retrieval, or during transport, the array is kept in a retracted condition where all the staves are brought up against the midbody, also in a parallel fashion, where the staves are aligned with the midbody. The unit contains a fail-safe mechanism whereby the array automatically collapses to this retracted condition upon sensing a failure of battery power. The retracted condition is a low drag configuration which is an essential characteristic which should be maintained during the retrieval phase of the operation. This is desirable in order to prevent damage to the unit which is often subjected to great stress when retrieved from great depth at a high velocity.

BRIEF DESCRIPTION OF THE DRAWINGS

FIGS. 3A and 3B are partial side views of the device illustrated in FIG. 1 showing the truss support arm and linkage structure used to connect the midbody and the transducer containing staves.

DESCRIPTION OF THE PREFERRED EMBODIMENT

Figure 1:
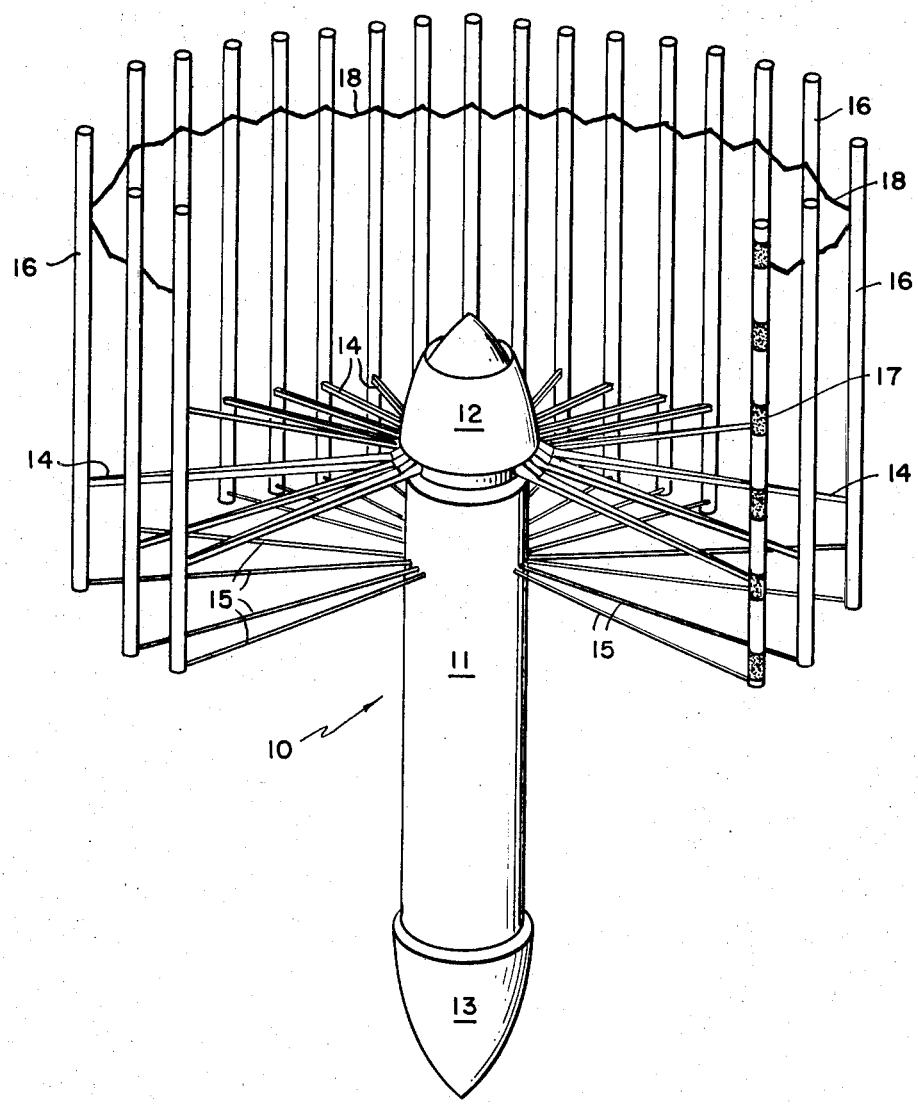
FIG. 1 is an overall perspective view of a transducer array unit illustrating an embodiment of the invention.

Referring now to the drawings wherein like reference numbers refer to like parts, and to FIG. 1 in particular, there is shown a perspective view of a sonar transducer array unit 10 constructed according to the teachings of this invention. The unit 10 has a major body 11 of preferably cylindrical configuration which will contain most of the electronics and motor drive elements of the unit which are required. At one end of the major body 11 is minor body, the upper ogive 12, and at the other end, another minor body, the lower ogive 13. Extending from the major body 11 are two sets of rigid arms 14, 15, each of which have inner and outer ends. The inner end of each arm 14, 15 is pivotal about the major body 11. The upper support arms 14 are attached to the major body 11 at the end closest to the upper ogive 12 while the lower support arms 15 are connected closest to the lower ogive 15. The upper support arms 14 are formed in a truss arrangement to be described in greater detail below and the lower support arms 15 are made of small diameter tubing. Located at the outer end of each of the arms 14, 15 are the transducer staves 16 which are also attached to the arm in a pivotal fashion. Each of these staves consist of a hollow tube containing, for example, six hydrophone elements 17 and their associated preamplifiers (not shown). Because of the multiple pivoting arrangement between the major body 11, each stave 16, and that staves' associated upper and lower support arms, the hydrophone staves 16 are free to extend radially outward from the major body 11 and contract to a position adjacent to the major body 11 in a parallel fashion, forming an extremely compact package. Since rigidity between the staves 16 is important, a rigidizing link 18, the subject of further description below, is connected between each stave and the next adjacent stave.

Figure 2:
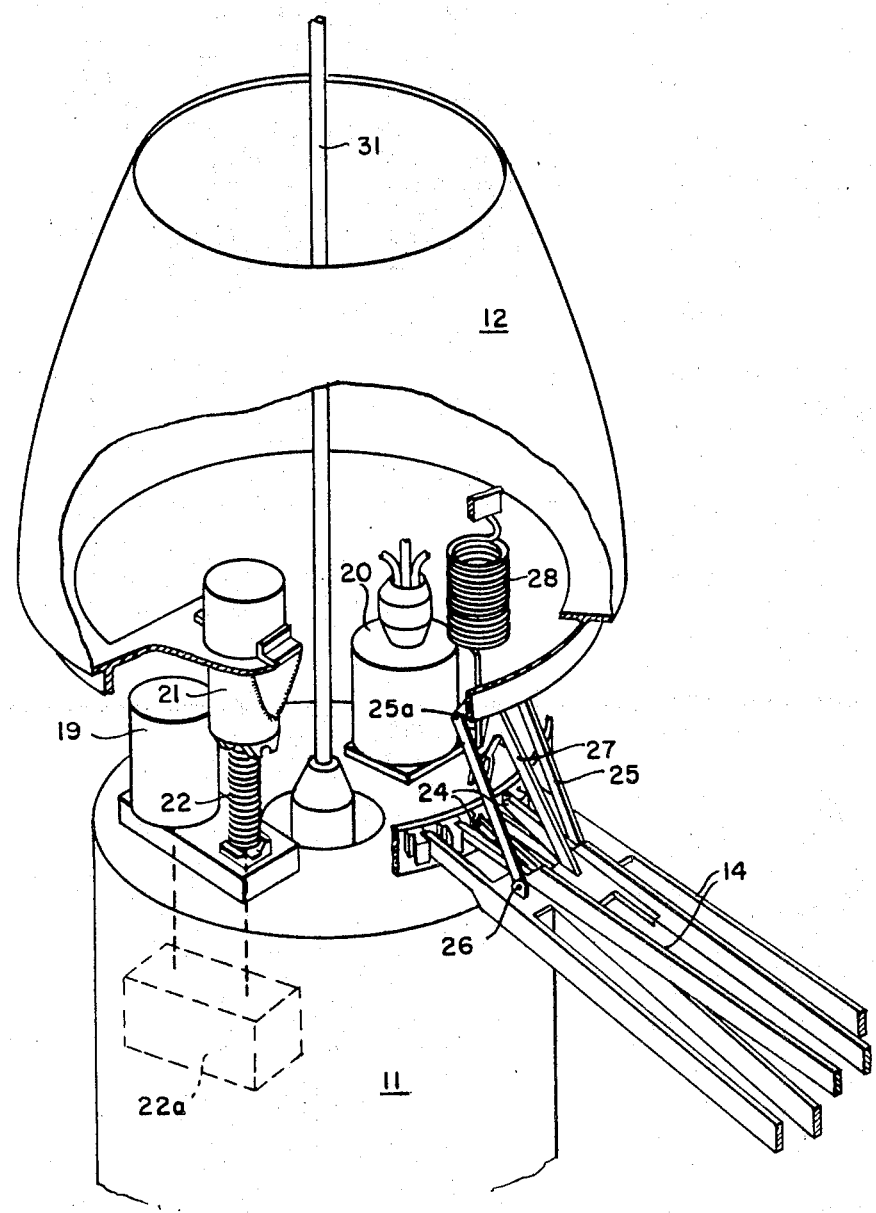
FIG. 2 is an enlarged perspective break-away view of the upper ogive and the upper portion of the midbody shown in FIG. 1.

In FIG. 2 the details of the upper ogive 12 portion of the unit are clearly shown. The upper ogive 12 is raised from the major body 11 by an actuation system consisting of four components, an AC motor 19, an inverter 20, a gear train (shown as element 22a) and a fail-safe mechanism 21 which operates to collapse the array upon failure of the battery power. Array expansion and retraction are accomplished by linear motion of the upper ogive 12 imparted by means of the drive screw 22. Power from a DC battery power source (not shown) is converted by the inverter 20 to AC and applied to the AC motor 19 which drives the gear train coupled to the drive screw 22. The drive screw 22, in turn, imparts its linear force to the ogive 12 via the tubular fail-safe mechanism 21. The ogive 12 can be raised or lowered by controlling the direction of rotation of the motor shaft and is held in an expanded position by the friction of the gear train.

In FIG. 2, line 31 is the cable by which the unit is lowered and raised into and from the water and contains the electrical conductors over which the motor control signals and acoustic signals are carried.

Figure 4:
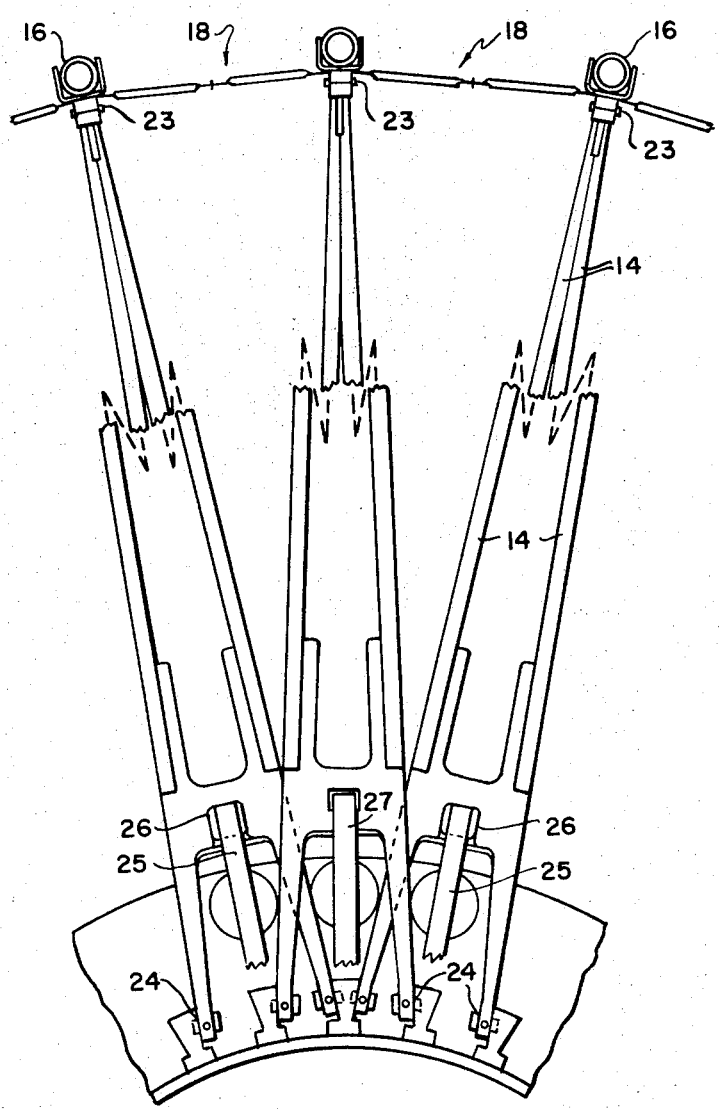
FIG. 4 is a partial top view of the structure illustrated in FIG. 2.

Referring now to FIGS. 2, 3, and 4, there are shown detailed presentations of the static mechanical elements supporting the transducer containing staves 16 which form the array. Each of the upper support arms 14 has a generally triangular shape in longitudinal cross section with its apex at the outer end attached to one of the transducer stave pivots 23 and its base at the inner end connected to the major body 11 at pivots 24. The legs of the triangle consists of two tubular members, preferably rectangular in transverse cross section and terminate in said pivots 24. Rigid, straight links 25 are pivotally connected by pivots 25a to the upper ogive 12 and are pivotally connected to the upper support arms 14 by means of pivots 26. These straight links 25 serve as the linkage which causes the upper support arms 14 to swing out from the major body 11 by the previously described actuation system. Disposed at a plurality of spaced positions, preferably 90° apart, are a plurality of bell crank links 27 which are essentially the same as the straight links 25 with an additional lever arm and attachment point for the retraction springs 28. The retraction springs 28 are designed to provide an initial preload of several hundred pounds (which increases when the array is expanded) on the mechanism to maintain the array in a retracted position in the absence of an actuation force. In the preferred embodiment there are four retraction springs and bell crank links.

The lower support arms 15, during extension, merely follow the action of the upper support arms 14. They act as guides when the staves 16 are fully extended and act as stabilizing means by restraining radial and circumferential movement of the staves 16 relative to the major body 11 thereby adding to the rigidity of the array. These arms are linked via pivot points 29 and 30.

Figure 6:
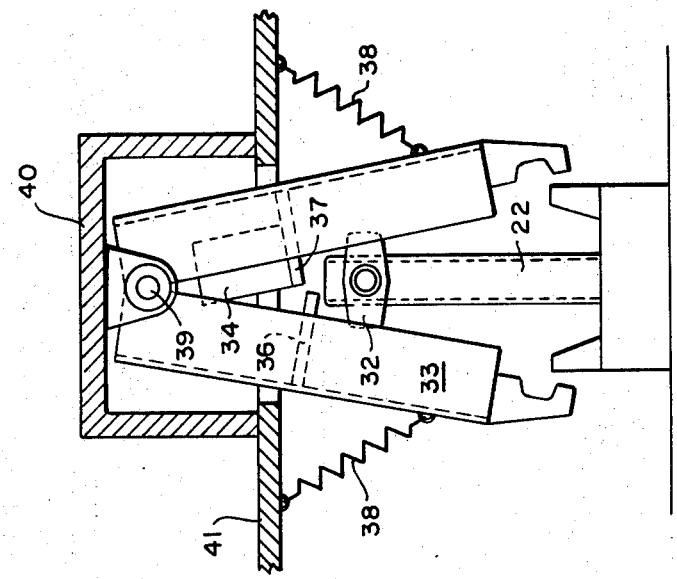
FIG. 6 is a side view of the fail-safe mechanism of FIG. 5 in the "fail" condition.
Figure 5:
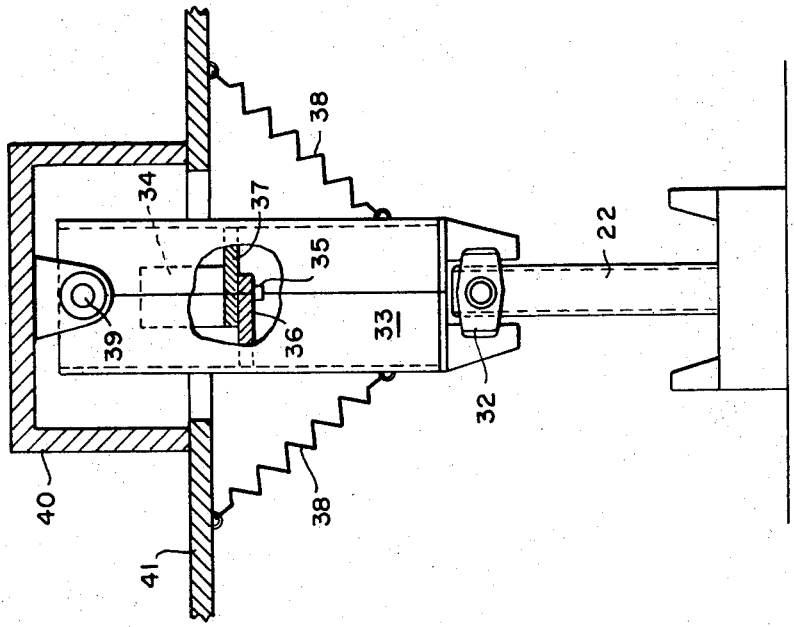
FIG. 5 is a side view of a fail-safe mechanism also illustrated in FIG. 2 for enabling automatic retraction of the array unit.

FIGS. 5 and 6 depict the previously discussed fail-safe mechanism 21, shown in FIG. 2, which automatically allows the collapse of the array upon failure of the battery power, thereby insuring retraction at any time when there is not sufficient power available to drive the motor. Attached to the drive screw 22 is a trunnion nut 32. A length of split tubing 33 is designed to capture the trunnion nut 32 and thereby transmit the force applied to the trunnion nut by the drive screw 22 to the upper ogive 12, as shown in FIG. 2, whenever power is applied. The two halves of the tubing 33 are held together by a linear solenoid 34 whose plunger or pin 35 is placed through superimposed holes in two plates 36, 37, plate 37 being attached to one portion of tube 33, and plate 38, to the other portion of tube 33. If battery failure occurs, the solenoid pin 35 will retract and the two halves of the split tubing 33 will then separate by means of the disengage springs 38. The tubing 33 then splits in a pivotal fashion around pivot 39 contained in a mounting bracket 40 which is, in turn, mechanically attached to a base plate 41 of the upper ogive 12. The result of this reaction to the power failure is that the ogive 12 is then mechanically decoupled from the overall actuator mechanism, allowing collapse or retraction of the array.

Figure 7:
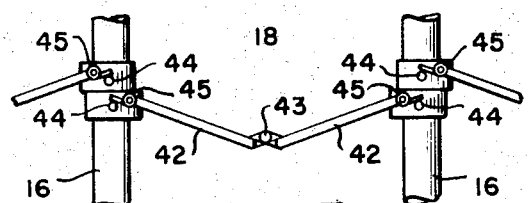
FIG. 7 is a view in greater detail of a portion of the support apparatus shown in FIG. 1.

Another portion of the array unit 10, the rigidizing links 18, is shown in FIG. 7. These links 18 are located a few inches from the top of the hydrophone staves 16 and provide both circumferential rigidity and proper stave-to-stave spacing in the hydrophone array when in the expanded position. These links expand and contract as the distance between the staves 16 and the major body 11 changes. It is a natural consequence of the structure described above that the distance between the staves 16 themselves will increase as the distance between the major body 11 and the staves 16 increases, and therefore, the expansion capability of the links in the plane formed by its associated pair of staves 16 is a necessity. The rigidizing links 18 are each basically a scissors linkage in which the two halves of linkage arms 42 are hinged together at their common connection at the midpoint 43 between the staves and which rotate about pivots 45 at their other ends at the stave positions. When the array is retracted, the linkages fold together and nest behind the staves 16. When the array is fully expanded, the linkage arms 42 rotate until they hit rigid stops 44 at the stave centerlines. The tension in the linkage forms a rigid ring about the circumference of the array.

What has been disclosed is an expansion mechanism for a transducer array displaying many improved characteristics. The array formation has proved very reliable and durable, as it requires few parts, is inherently stable and it constitutes a reduced loading configuration. It should be understood, of course, that the foregoing disclosure relates to only a preferred embodiment of the invention and that numerous modifications may be made therein.

What is claimed is:
1. A collapsible transducer array arrangement comprising:
   an elongated major body having a longitudinal axis;
   a minor body attached to one end of said major body for movement along said longitudinal axis;
   a plurality of outwardly extendable support arms having outer and inner ends, the inner ends being pivotally attached to the periphery of said major body at positions in proximity to said minor body;
   a plurality of links, at least one for each of said support arms, each of said links having an inner end pivotally attached to said minor body for movement therewith, and an outer end pivotally attached to a support arm;
   a plurality of stave means, one for each support arm, each of said stave means housing a plurality of transducers and additionally being pivotally attached to the outer end of one of said support arms;
   reinforcing means attached to said stave means for further essentially rigid support of said staves; and
   driving means coupling said major and minor bodies for producing movement relative to each other;

whereby upon relative movement of said major and minor bodies in one direction under force of said driving means, said links draw said support arms away from said major body to thereby position said stave means in an array relative to said major body, and whereby upon relative motion of the major and minor bodies in a second direction said stave means, support arms, reinforcing means and links are retracted to positions essentially alongside the periphery of said major body.

2. The array of claim 1 in which the reinforcing means includes a second plurality of outwardly extendable support arms having outer and inner ends, the inner ends being pivotally attached to the periphery of said major body at positions remote from said minor body and the outer ends being pivotally attacehd to the stave means.

3. The array of claim 1 in which the reinforcing means includes a rigidizing link between each stave means and the next adjacent one, each of said rigidizing links being connected to its associated stave means by pivots.

4. The array of claim 1 in which the reinforcing means includes both a second plurality of outwardly extendable support arms remote from said minor body and a rigidizing link between each stave means and the next adjacent one.

5. The array of claim 1 in which the stave means are hollow staves, each containing a plurality of hydrophone elements.

6. The array of claim 1 in which the plurality of outwardly extendable support arms each have a truss configuration.

7. In the collapsible transducer array of claim 6, the fail-safe means including a solenoid for sensing the failure of said power source.

8. In a collapsible transducer array having:
an elongated major body having a longitudinal axis;
a minor body for attachment to said major body and movement along said longitudinal axis;
a driving means for connecting and moving said bodies relative to each other;
a power source;
a plurality of outward extendable arms for supporting an array of transducers;
the combination therewith of a fail-safe means included in said driving means for coupling said major and minor bodies and for automatically collapsing said arms to positions essentially alongside the periphery of said major body upon the failure of said power source.

References Cited
UNITED STATES PATENTS

| | | | |
|---|---|---|---|
| 1,779,437 | 10/1930 | Loughridge et al. | 343—881 |
| 3,160,847 | 12/1964 | Beck et al. | 340—8S |
| 3,394,380 | 7/1968 | Pickles | 343—839X |

RODNEY D. BENNETT, JR., Primary Examiner

B. L. RIHANDO, Assistant Examiner

U.S. Cl. X.R.

343—709, 881